J. J. SCHERMACK.
ENVELOP SEALING AND STAMPING MACHINE.
APPLICATION FILED JAN. 14, 1907.

1,146,902.

Patented July 20, 1915.
9 SHEETS—SHEET 2.

J. J. SCHERMACK.
ENVELOP SEALING AND STAMPING MACHINE.
APPLICATION FILED JAN. 14, 1907.

1,146,902.

Patented July 20, 1915.
9 SHEETS—SHEET 4.

J. J. SCHERMACK.
ENVELOP SEALING AND STAMPING MACHINE.
APPLICATION FILED JAN. 14, 1907.

1,146,902.

Patented July 20, 1915.
9 SHEETS—SHEET 5.

WITNESSES.

INVENTOR.
Joseph J. Schermack

J. J. SCHERMACK.
ENVELOP SEALING AND STAMPING MACHINE.
APPLICATION FILED JAN. 14, 1907.

1,146,902.

Patented July 20, 1915.
9 SHEETS—SHEET 6.

WITNESSES.

INVENTOR.
Joseph J. Schermack

J. J. SCHERMACK.
ENVELOP SEALING AND STAMPING MACHINE.
APPLICATION FILED JAN. 14, 1907.

1,146,902.

Patented July 20, 1915.
9 SHEETS—SHEET 6.

WITNESSES.
O. B. Baenziger
Amelia Williams

INVENTOR.
Joseph J. Schermack
By Whittemore, Hulbert & Whittemore
Attys.

UNITED STATES PATENT OFFICE.

JOSEPH J. SCHERMACK, OF DETROIT, MICHIGAN, ASSIGNOR TO DETROIT MAILING MACHINE CO., OF DETROIT, MICHIGAN, A CORPORATION OF MICHIGAN.

ENVELOP SEALING AND STAMPING MACHINE.

1,146,902.     Specification of Letters Patent.     Patented July 20, 1915.

Application filed January 14, 1907. Serial No. 352,277.

*To all whom it may concern:*

Be it known that I, JOSEPH J. SCHERMACK, a citizen of the United States of America, residing at Detroit, in the county of Wayne and State of Michigan, have invented certain new and useful Improvements in Envelop Sealing and Stamping Machines, of which the following is a specification, reference being had therein to the accompanying drawings.

The invention relates to machines for sealing and stamping envelops, and consists in the novel construction, and coöperative association of the sealing and stamping mechanisms as hereinafter set forth.

In the drawings, Fig. 9 is a plan view thereof.

In general construction, the machine comprises a feeding mechanism for the envelops, together with sealing and stamping mechanisms, arranged upon opposite sides of the plane of feed. In order to simplify the construction, and secure greater compactness, the moistened stamps are pressed into contact with the envelops by the same rolls that complete the sealing. Furthermore, the stamp feeding, moistening, and cut-off mechanism is dependent for its operation upon the feeding of the envelop, and during its travel between the flap moistening mechanism and the sealing rolls.

A further characteristic in the general organization of the machine is that the envelops are fed uninterruptedly in a straight line, and preferably in a vertical plane between the points of engagement and delivery. Thus the mechanism may be operated at a higher rate of speed than where the direction of feed is changed. Still further, the machine is preferably provided with automatically operating stacking means at the delivery end, and automatic means for successively feeding the envelops from a stack at the opposite end, so that the entire operation of the mechanism is automatic.

Figure 1:
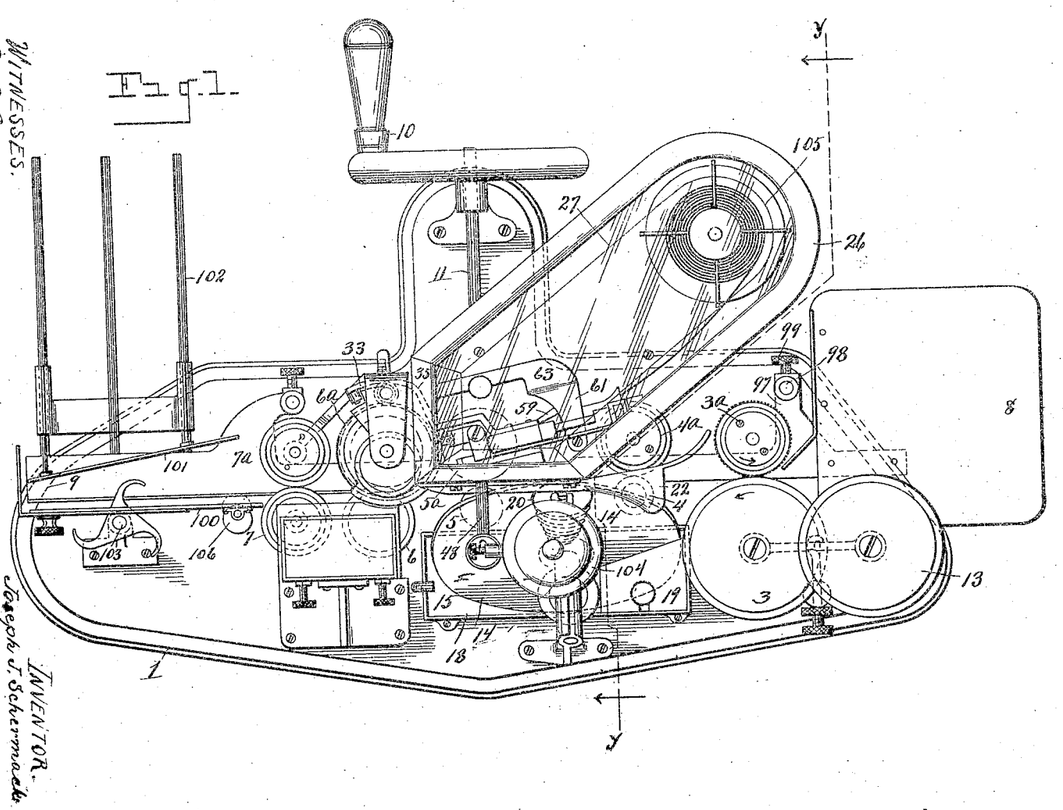
Figure 1 is a plan view of the machine.
Figures 2, 31:
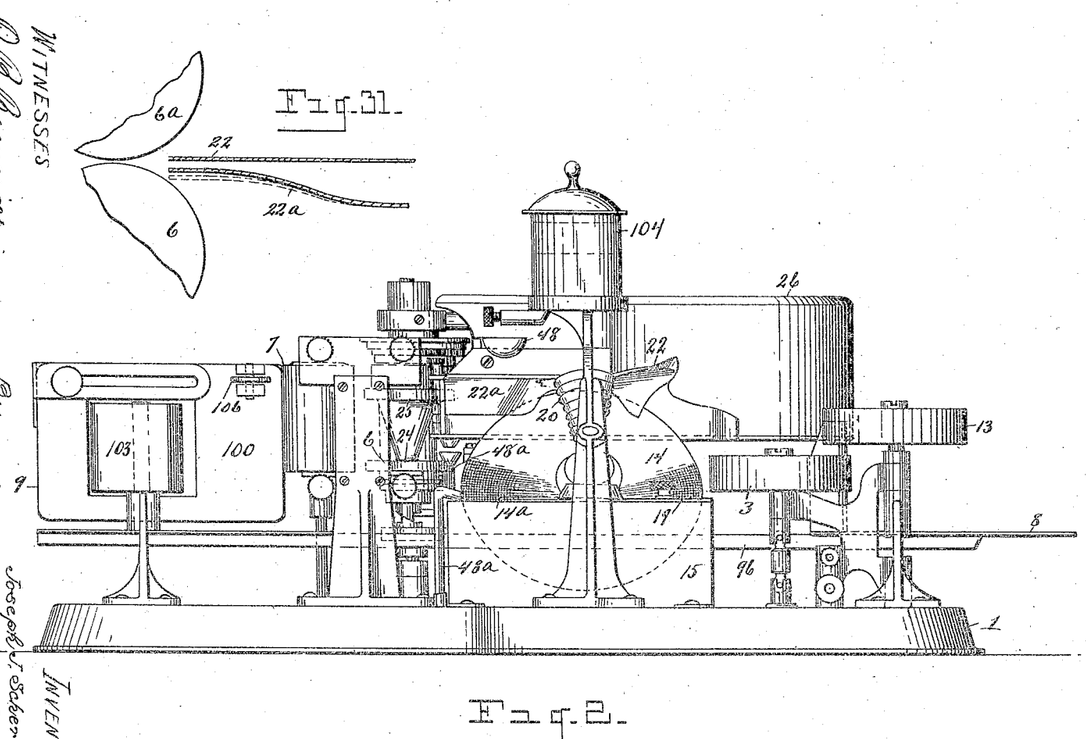
Fig. 2 is a side elevation thereof.
Fig. 31 is a horizontal section through the flap closing guide.
Figure 3:
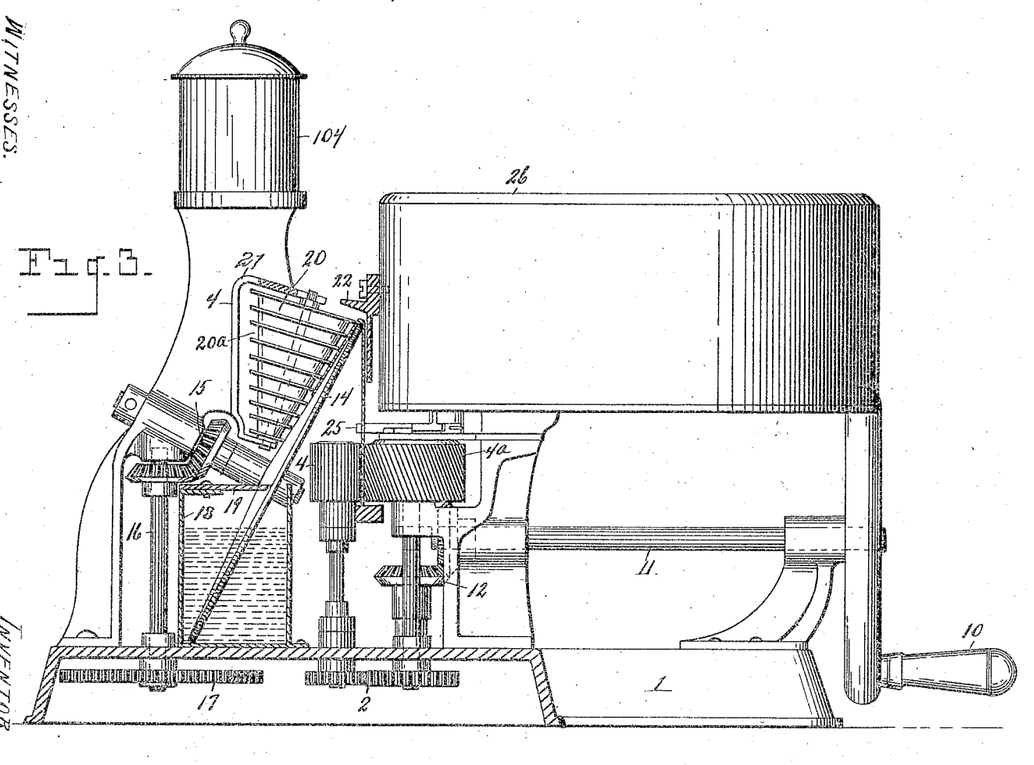
Fig. 3 is a cross section.
Figures 4, 5, 6, 7:
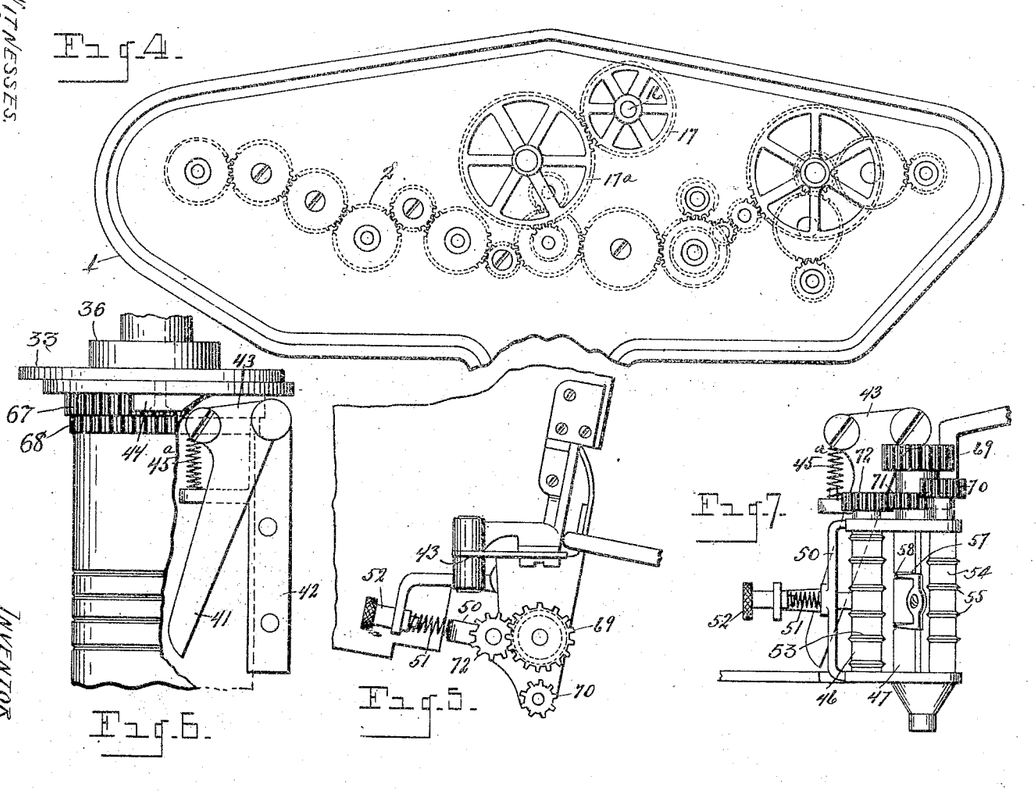
Fig. 4 is a bottom plan view.
Fig. 5 is a detail plan view of the stamp severing and feeding mechanism.
Fig. 6 is a sectional elevation of the same partly in section.
Fig. 7 is a similar elevation showing the stamp feeding and moistening rolls broken away in Fig. 6.
Figure 7:
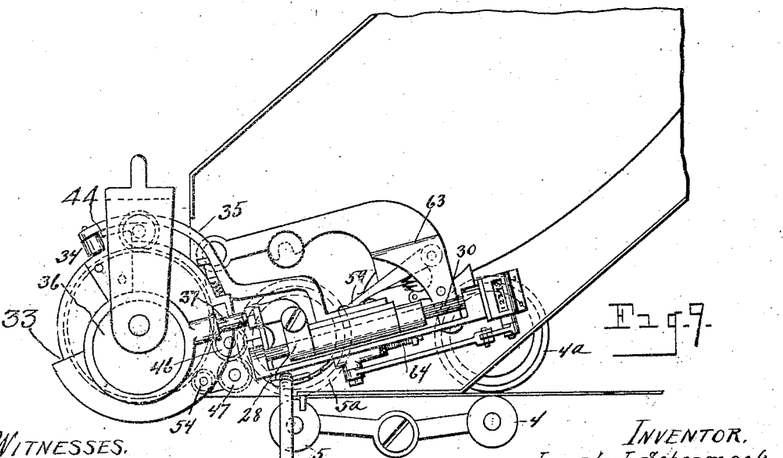

In detail, 1 is a suitable base, preferably hollow, and having arranged therein a gear train 2, through which motion is communicated to the several sets of rolls constituting the feed mechanism. These feeding rolls are mounted on vertical spindles arranged upon opposite sides of a longitudinal vertical plane above the base, and are so distributed as to pass the envelops continuously from one end to the other. As shown in Fig. 1, five pairs of rolls respectively 3 3ª, 4 4ª, 5 5ª, 6 6ª, and 7 7ª. are arranged above the bed, and carry the envelops successively from the stack holder 8 to the stack receiving holder 9. These rolls are all continuously driven through the medium of the gear train 2, and are preferably actuated by a hand-crank 10 upon the transverse shaft 11, which is connected by the bevel gear wheels 12, with one of the vertical spindles. In addition to these rolls, a feed roll 13 is arranged opposite the stack holder 8, and bears against the end envelop of the stack, feeding it forward into engagement with the pairs of rolls 3 3ª. The feeding of more than one envelop at a time is prevented by driving one of the rolls of this pair, such as 3ª, in the reverse direction, as indicated by the arrow, this serving to separate two envelops pressed together, and to delay the feeding of one until the other has passed out of engagement with the rolls 3 3ª.

*Sealing mechanism.*—The envelops, as they are fed from the stack holder 8, and after passing the first pair of rolls 3 3ª come into engagement with the flap moistener. This comprises a revoluble disk 14, which is driven continuously through the medium of the bevel gear wheels 15, vertical spindle 16, and gear wheel 17, the latter being driven from the gear train 2, through the intermediate gear 17ª. The disk 14 is arranged in an inclined plane, the uppermost point in its periphery being substantially in the plane of feed, and the lower portion being immersed in a water tank 18. The face of the disk is slightly coned, and is preferably serrated, as by fine tool marks in machining, as indicated at 14ª, so as to better hold the moisture. A scraper 19 is arranged above the tank in contact with the disk on its up-moving side to remove the superfluous moisture. 20 is a conical roll bearing against the face of the disk 14, and journaled in slotted bearings in a frame 21. This roll serves to press the flap of the envelop in contact with the face of the disk 14, whereby the gummed edge is thoroughly moistened. The roll 20 is preferably formed of a series of thin flanges, or disks 20ª, which present but slight surface in contact with the disk 14, and thus very little moisture will be picked up by these flanges from the moistened disk when the envelop flap is not therebetween. 22 is a guide arranged above the disk 14, and serving to guide the flaps of the envelops in contact therewith. One side 22ª of this guide is yielding and resilient so as to compensate for different thicknesses of stock.

The completion of the sealing, after the moistening of the flap of the disk 14, is effected by the pairs of rolls 6 6ª and 7 7ª. The roll 6 is centrally cut away so as to only contact with the marginal portions of the envelop by the portions 24 and 25 thereof, and thus the portion of the flap nearest the hinge or fold is first pressed into contact with the body of the envelop and wrinkling is prevented. Finally the rolls 7 7ª press the remainder of the flap in contact with the body of the envelop, and thus completes the sealing.

*Stamp feeding mechanism.*—Simultaneous with the operation of the sealing mechanism, the stamp applying mechanism is operated upon the opposite side of the plane of feed. This mechanism comprises means for intermittently feeding a strip of stamps, a cut-off for severing one of the stamps from the strip, a moistener for the severed stamp, and feeding means for bringing the moistened face of the stamp in contact with the envelop. It is essential that the operation of the mechanism should be timed with the feeding of the envelop, and should be dependent upon the feeding, so as to be inoperative when no envelop is fed. This is accomplished by arranging a trip or trigger 25 in the path of the forward edge of the moving envelop, as it passes from the moistening disk 14 to the rolls 6 6ª. This trip or trigger sets in operation the stamp feeding mechanism, which is of the following construction: The stamps are in the form of a continuous strip reeled upon a holder. This holder, together with the stamp feeding, cutting off, and moistening mechanism, is preferably inclosed in a housing 26, which is suitably mounted above the bed, and is preferably provided with a transparent top plate 27, through which the operation of the mechanism may be inspected. The feeding of the strip is primarily effected by a reciprocating pair of gripping jaws 28 and 29, which are upon opposite sides of the stamp strip, and during their forward movement are in clamping contact therewith, while in their return movement their grip is released. These jaws are slidably and pivotally mounted upon a guide rod 30, which is mounted upon a frame 31 within the housing 26. 32 is a spring for yieldingly drawing the jaws 28 and 29 into contact. 33 is a revoluble cam, which at one point in its movement engages with an anti-friction roll 34 on an arm 35 connected with the jaw 29, thereby rocking said arm and jaw, and releasing the grip upon the stamp strip. 36 is an eccentric revolving with the cam 33, and connected by a rod 37 with the jaws 28 and 29. This eccentric serves to reciprocate the jaws upon the rod 30, and the movement is so timed in relation to the operation of the cam 33 that the jaws are separated during their return movement to release the stamp strip, and are permitted to clamp under the tension of the spring 32 during their forward movement. The stamp strip, during this feeding movement, is in engagement with grooved guides 38, secured to the frame 31, and 39 is a spring pressed guide, which holds the strip against a backing plate 40 with sufficient friction to prevent the displacement of the strip when released by the gripping jaws 28 and 29 when the jaws are opened by the cam 33. 40 is the spring for actuating the guide 39.

The plane of movement of the reciprocating gripping jaws 28 and 29, and the stamp guide 38, is preferably at an angle to the plane of feed of the envelop, and the direction of the feed of the stamp strip is toward the feeding plane of the envelop. At the end of the guide 38 is arranged a cut-off for severing a stamp from the strip when projected beyond the said guide 38. This cut-off comprises a hinged shear blade 41, and a stationary blade 42 arranged upon opposite sides of the plane of the stamp strip. The blade 41 is provided with an actuating rock arm 43, which is in the path of a revoluble cam 44, and is actuated thereby to sever the strip. 45ª is a spring for retracting the blade 41 when released by the cam 44.

The stamp, when projected beyond the guide 38, passes between tapering guides 45, which direct its forward edge into contact with a pair of rolls 46 and 47. The roll 47 is the moistener for the gummed surface of a stamp, and to this end water is fed from a conduit 48, and through a nozzle 49 into contact with the surface of the upper end of the roll, from which point it travels downward over the entire surface. The roll 46 is a spring pressed roll, being journaled in a yoke 50, against which the spring 51 bears, the tension of said spring being adjusted by a set screw 52. The periphery of the roll 46 is preferably formed of a plurality of thin disks 53, which limit the contacting surface, and prevents it from picking up moisture or gum from the roll 47. The location of the rolls 46 and 47 is in proximity to the feed roll 6ª of the envelop feeding mechanism. Adjacent to this roll 6ª is a feed roll 54, between which rolls the stamp is fed upon passing out of engagement with the rolls 46 and 47. The face side of the stamp bears against the roll 6ª, and its moistened gummed side against the roll 54. The latter is therefore provided with thin disks, or V-shaped flanges 55, to present as small a surface as possible in contact with the gum, and to prevent transferring gum from these flanges to the roll 6ª. The latter is provided with grooves 56 opposite the flanges 55. This permits of adjusting the roll 54 as close as desired to the roll 6ª, and at the same time holding the flanges 55 out of contact therewith. 57 are stripping fingers, which project into grooves 58 in the moistening roll 47, preventing the moistened stamp from adhering to said roll, and directing it between the rolls 55 and 6ª.

All of the parts of the stamp feeding, cutting off and moistening mechanisms are timed in relation to each other, and when set in operation by the actuation of the trigger 25 through mechanism that will be hereinafter described, operates in timed relation to the feeding of the envelop. The timing is such that when a moistened stamp passes between the rolls 54 and 6ª, its forward edge will come in contact with the advancing envelop, so that both will pass together between the rolls 6 6ª, the stamp being thereby affixed to the envelop in the proper position and being rolled into contact. In the further movement, the stamped envelop passes between the roll 7 and 7ª, which completes the sealing, and also firmly presses the stamp in contact with the envelop. Thus the stamping and sealing operations are performed simultaneously, and within the same space of travel of the envelop required for either one of the operations.

*Correcting feed.*—As it is essential that the severing of the stamp strip should always occur between adjacent stamps, and in line with the perforations, a correcting feed is provided, in addition to the feeding jaws 28 and 29. This correcting feed comprises a series of adjacent pointed pawls 59, which are pivotally attached at 60 to a lever 61, and are pressed by the individual springs 62 against the stamp strip while in engagement with the guide 38. The lever 61 is fulcrumed in a frame 63 normally arranged adjacent to the guide 38, and one end of the lever projects into the path of a member 64 on the reciprocating jaw 28, so that in the return movement of said jaw the lever 61 will be actuated. This will impart movement in the opposite direction to the pawls 59, and the amount of movement is determined by an adjustment of the member 64, which is preferably a threaded rod engaging the jaw. By properly adjusting this member, the pawls 59 may be caused to travel to an exactly predetermined point, and the arrangement is such that during their travel, if the stamp strip is not correctly positioned, one or more of the pawls will engage with the perforations in the strip and will feed the strip to the proper position. If on the other hand the strip is correctly positioned before the movement of the pawls, they merely slide over the strip, and at the end of their movement they will be in registration with the perforations. The frame 63 is preferably pivoted at 63ª to be thrown back when a stamp strip is to be inserted.

The mechanism, through which movement is imparted to the stamp feeding and cutting off mechanism, when the trigger 25 is operated, comprises a suitable train of gearing connecting with the envelop feeding mechanism, and a clutch in said train controlled by said trip or trigger 25. To economize space, some members of this train are mounted upon the vertical spindle 65, upon which the roll 6ª is mounted. Thus the eccentric 36 and the cams 33 and 44 are all secured to a common member 66, which is sleeved upon the spindle 65 above the roll 6ª. This sleeve 66 has also attached to it the gear wheels 67 and 68, from which the feed rolls 47 and 55 are driven through the medium of the pinions 69 and 70 on their respective shafts, said pinions intermeshing with said gear wheels. The feed roll 46 is also driven through the pinion 69 by intermeshing pinions 71 and 72 respectively on the rolls 47 and 46.

Movement is imparted to the sleeve 66 and members attached thereto through the medium of a pinion 73 meshing with the gear wheel 68, and mounted upon a vertical shaft 74 extending parallel to the roll 6ᵃ and journaled in bearings on the frame. The lower end of this shaft 74 has secured thereto a pinion 75, meshing with a gear wheel 76 sleeved on the spindle 65 below the roll 6ᵃ. Adjacent to this gear wheel 76 is a clutch mechanism comprising adjacent friction disks 77 and 78, the former being fixed and the latter loose upon the spindle 65.

Figure 8:
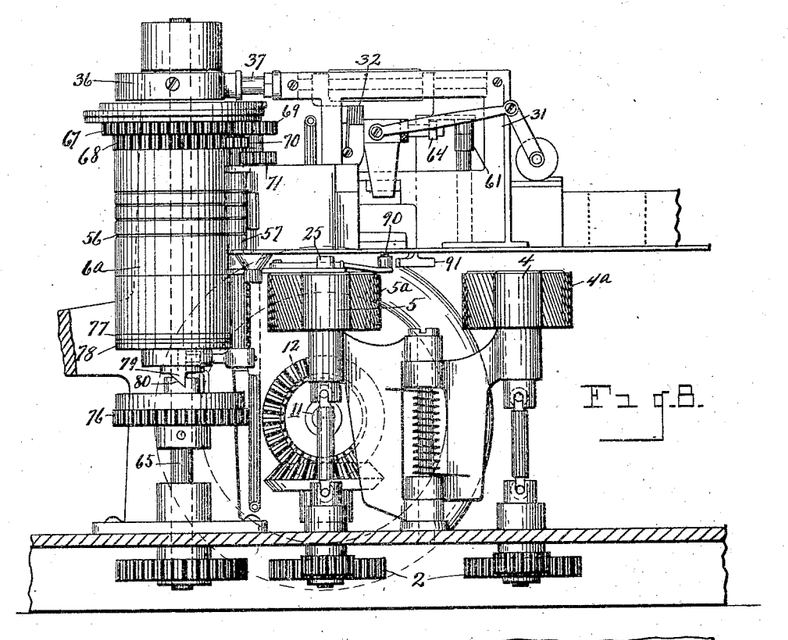
Fig. 8 is a longitudinal section substantially in the plane of feed showing a portion of the mechanism.
Figure 10:
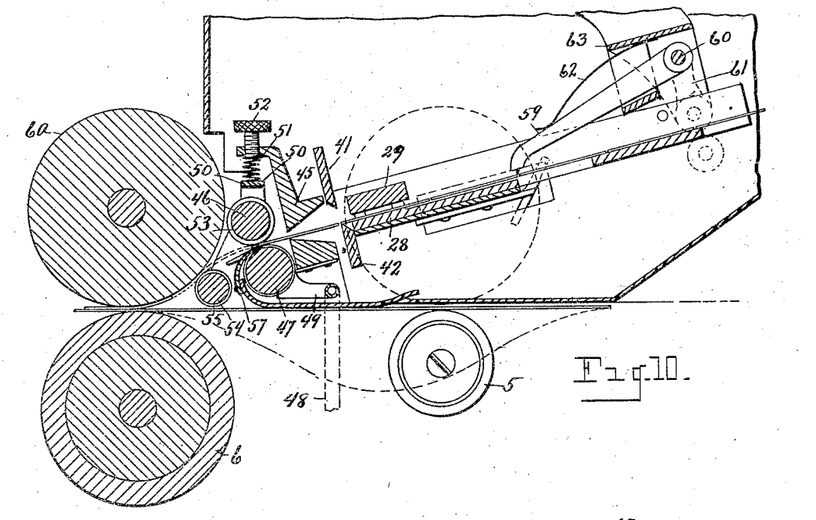
Fig. 10 is a horizontal section through the stamp applying mechanism.
Figures 11, 12, 13:
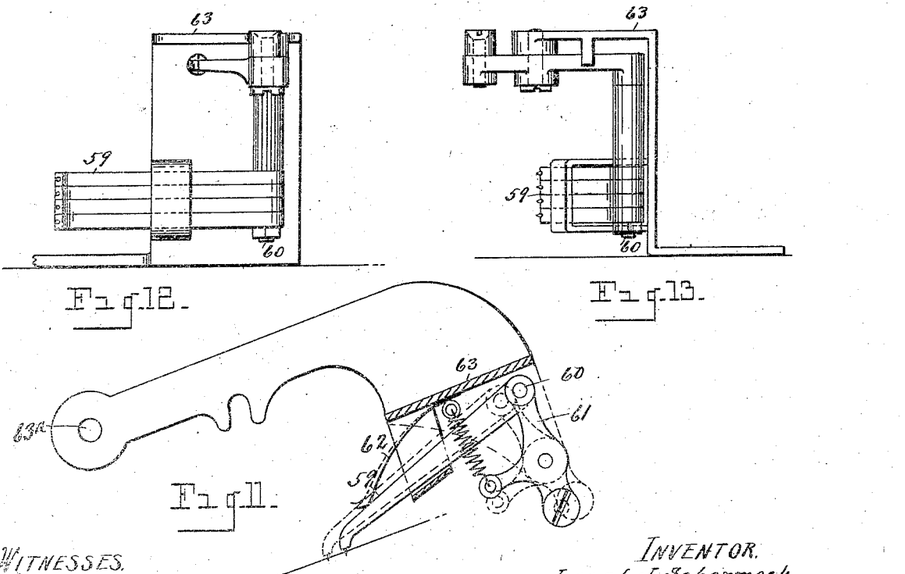
Fig. 11 is a plan view of the correcting feed for the stamp strip.
Figs. 12 and 13 are respectively front and end elevations thereof.
Figure 14:
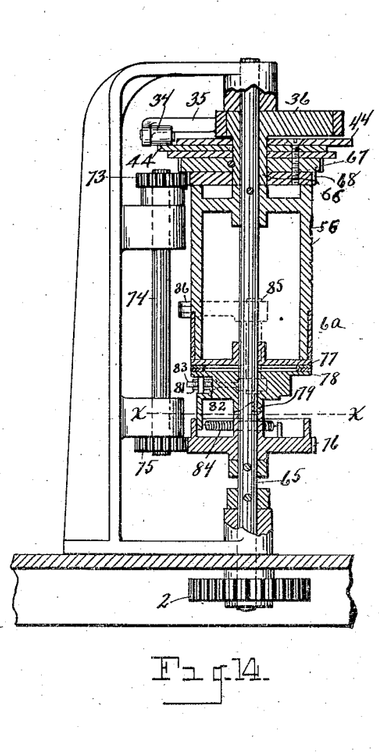
Fig. 14 is a section through the sealing rolls in a plane transverse to the plane of feed.
Figures 15, 17, 18:
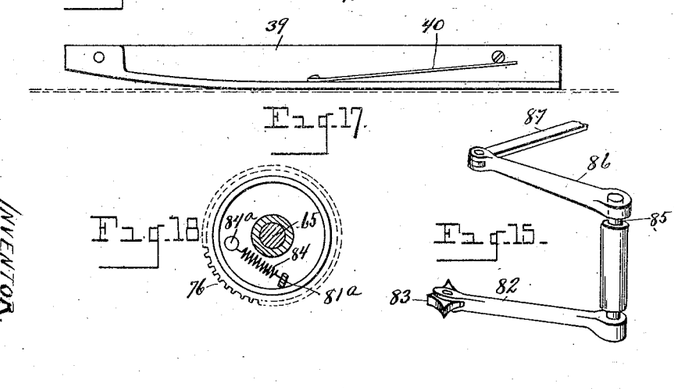
Fig. 15 is a perspective view of the envelop actuated trip.
Fig. 17 is a plan view of the presser guide for the stamp strip.
Fig. 18 is a horizontal section on line $x-x$, Fig. 14.
Figure 16:
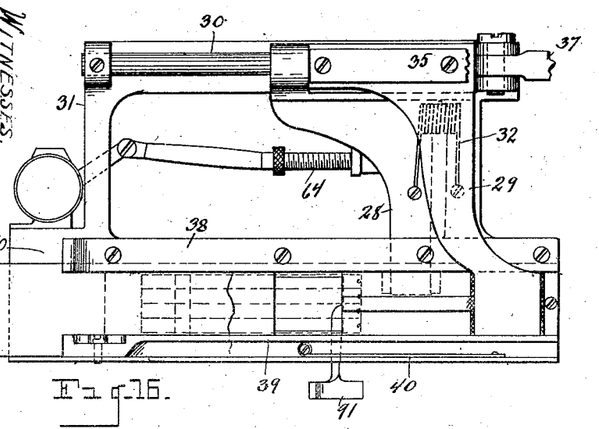
Fig. 16 is a side elevation of the stamp feeding mechanism.

79 is a cam, or inclined face, on the hub of the friction disk 78, and 80 is a complementary incline on the hub of the gear wheel 76. Thus a slight rotation of one hub in relation to the other will cause the incline 79 to mount the incline 80, thereby pressing the friction disk 78 against the disk 77. The disk 78 is further provided with a pin or finger 81 projecting into the path of a stop-arm 82, having a revoluble star wheel 83 at its free end for engagement with the pin 81. This stop-arm normally holds the disk 78 from rotation, but, when the stop is withdrawn, there is sufficient friction between the disks 77 and 78 to produce a slight rotation of the latter, which will cause the mounting of the incline 79 on the incline 80, thereby firmly coupling the gear wheel 76 to the spindle. See Fig. 8. The disks 77 and 78 are held normally in contact with sufficient pressure to provide this initial frictional movement by a spring 84 connected with a lug 84ᵃ on said gear wheel 76, and at its opposite end to a finger 81ᵃ on the member 78, its tension acting to draw the incline 79 and 80 toward each other.

Figure 19:
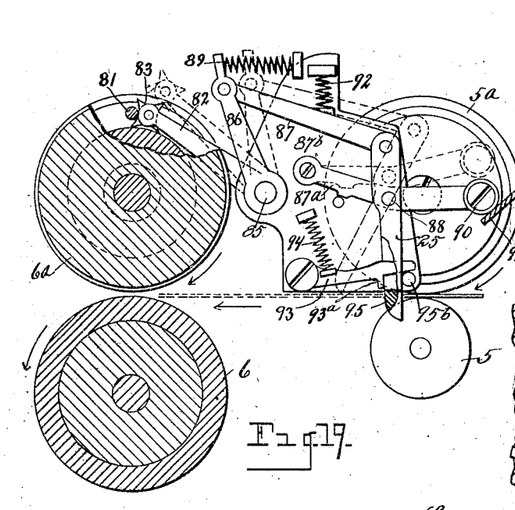
Figs. 19 and 20 are horizontal sections of the trip mechanism controlling the stamp applying mechanism.
Figure 20:
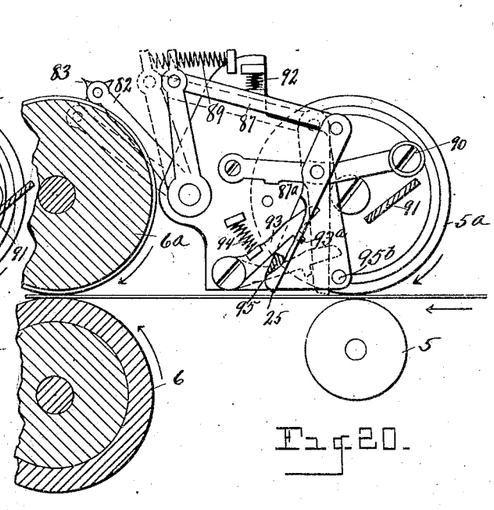
Figure 21:
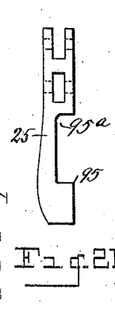
Fig. 21 is a detached elevation of the trip finger.
Figure 22:
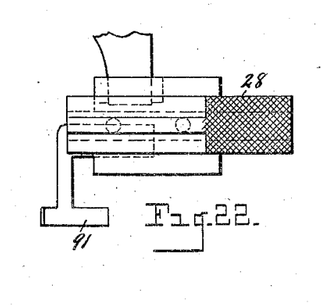
Fig. 22 is a side elevation of a portion of the stamp feeding mechanism.
Figures 23, 24:
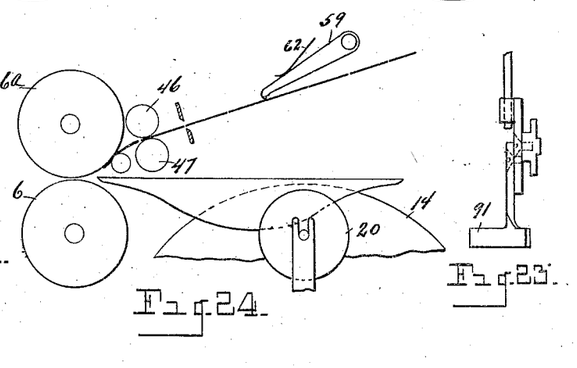
Fig. 23 is an end elevation thereof.
Fig. 24 is a diagrammatic plan view of the flap sealing and stamp applying means.
Figure 25:
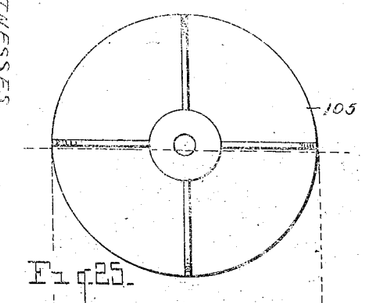
Figs. 25, 26 and 27 are respectively a plan, longitudinal section, and a bottom plan, of the reel for holding the stamp strip.
Figure 26:
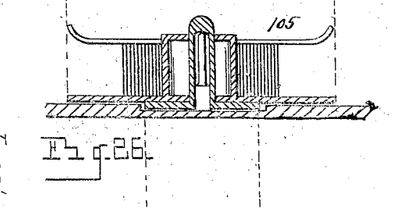
Figure 27:
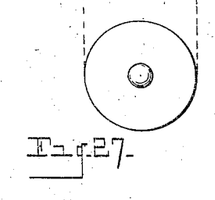
Figure 28:
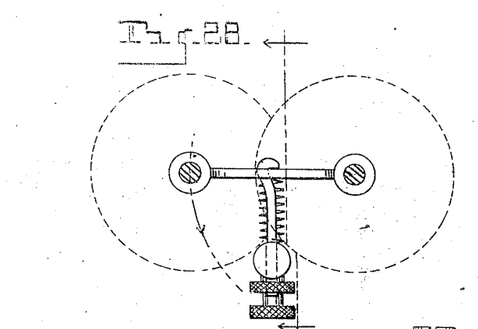
Figs. 28, 29 and 30 are respectively a horizontal section, end elevation and side elevation of a portion of the feeding rolls showing the tensioning means therefor.
Figure 29:
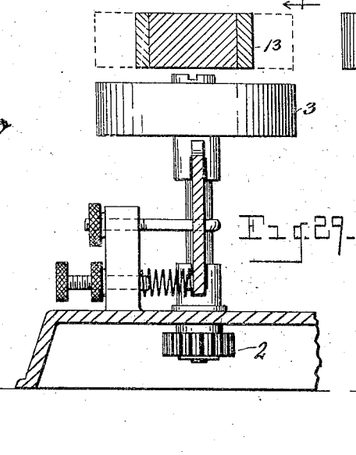
Figure 30:
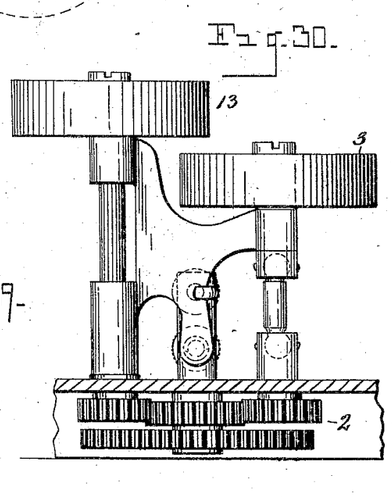

The stop arm 82 is controlled by the trip or trigger 25, through the following connections: 85 is a rock shaft to which the arm 82 is attached, and 86 an actuating rock arm for said shaft, having its free end connected by a link 87 with the inner end of the trigger 25. This trigger is pivotally connected at 88 to a rock arm 87ᵃ which, in normal position, projects the end of the trigger outward into the path of the envelop when traveling between the feeding rolls, and a spring 89 yieldingly holds the parts in this position. The rock arm 87ᵃ is pivoted to a fixed point at 87ᵇ and the free end of this rock arm is provided with an anti-friction roll 90, which is in the path of an inclined lug 91 depending from the jaw 28, and so arranged that when said jaw 28 is traveling forward the lug 91 will contact with the roll 90, and rock the arm or lever 87ᵃ inward to the position shown in dotted lines in Fig. 19. This will move the pivotal connection 88 inward and also through the connections 87 and 86 rock the trigger 25, the combined inward and rocking movement being sufficient to withdraw the trigger 25 clear of the path of the traveling envelop. Thus the actuation of the trigger by the end of the envelop will first draw upon the link 87, rock the arm 86, and stop arm 82 until the pin 81 is permitted to roll the wheel 83, and pass out of contact therewith, thereby clutching the gear wheel 76 to the spindle 65. This will set into movement the entire gear train for operating the stamp feeding and severing mechanisms, and during the early movement of the gripping jaws 28 and 29 the inclined lug 91 will contact with the roll 90, rocking the lever 87ᵃ and drawing inward the trigger 25. As soon as freed from the end of the envelop, the trigger will be moved rearward by the tension of the spring 89 operating thereupon through the medium of the link 87, and at the same time the stop arm 82 will be returned into the path of the pin 81, so as to disengage the clutch after the completion of one revolution. The trigger is returned before the envelop which actuates it has traveled clear from its path, this being permitted since the lever 87ᵃ moves the trigger inward, but as soon as the rear end of the envelop passes a spring 92 will again rock the lever 87ᵃ outward and project the trigger. A second actuation of the trigger by the same envelop while in frictional contact therewith is prevented by a latch 93 which is actuated by a spring 94 and which is adapted to engage a shoulder 95 on the trigger. The shoulder is formed by recessing or cutting away the trigger at 95ᵃ and during movement of the trigger, the latch travels in the cut away portion, as is shown in full lines in Fig. 20. The return of the latch by the spring 94 is limited by a stop 95ᵇ arranged in the path of the outer end of the latch. In the initial position of the latter the stop 95ᵇ holds the engaging shoulder 93ᵃ of the latch out of the path of the shoulder 95 (see full lines in Fig. 19) and upon movement of the trigger by the envelop the shoulder will engage the latch and raise the same (as shown in full lines in Fig. 20). During and after the return of the trigger when the end of the same is adjacent the line of feed of the envelop, and while the envelop is moving in close proximity thereto, if the latter came in contact with the trigger end there would be a tendency for the trigger to be again rocked by the envelop, but in this relation of the parts the shoulders 95 and 93ᵃ are in a position to abut (see dotted lines of Fig. 20) and will prevent forward rocking movement of the trigger. As soon as the envelop is withdrawn, however, and the trigger is projected to its initial position, the lug 95 is moved out of the path of the lug 93ᵃ.

As has been stated, unsealed and unstamped envelops are first placed in stacks in engagement with the stack holder 8, at the forward end of the machine, and are automatically fed therefrom by the roll 13, and succeeding pairs of rolls, until finally delivered to the stack receiving holder 9. To permit of adjusting the machine for various sizes of envelops, the stack holders 8 and 9 are preferably vertically adjustable, and are preferably connected to each other through the medium of a horizontally extending guide 96, which supports the lower edge of the envelop as it is being fed. All three parts are supported upon a frame, which has arms 97 sleeved upon vertical posts 98 rising from the base, and adjustably secured thereto by set screws 99. By loosening these set screws, the frame may be raised or lowered to any desired position of adjustment, and then securely fastened in its position.

The stack receiving holder may be of any suitable construction, but, as shown, comprises an angle plate 100, adjacent to the plane of feed, and a plate 101 at an angle to the plane of feed, and slidingly secured to laterally extending rods 102. The envelops, as they pass out of engagement with the rolls 7 7ª, are fed between the plates 100 and 101, and as they accumulate, the plate 101 is moved outward. This movement is effected by a rotating member 103, which is provided with curved arms successively bearing against the innermost envelop in the stack, and pressing outward thereupon, so as to provide room for a succeeding envelop.

To adjust the machine for operation, the guide 96 and stack holder attached thereto are first vertically adjusted, so that the upper edge of the envelop of the size to be used is in line with the upper end of the flap moistening disk 14. Water is placed in a tank 18, in which the disk 14 is immersed, and also in an elevated tank 104, from which it is fed through the conduit 48 to the stamp moistening roll 47 and from said roll through a conduit 48ª to the tank 18. A rolled stamp strip is then placed upon the reel 105, within the housing 27, and the end of the strip is passed into engagement with the guide 38, and the gripping jaws 28 and 29. The machine is now in position for operation, and it is only necessary for the operator to place a stack of unsealed envelops on the holder 8, and then to start the machine by the rotation of the crank 10. This will set into operation all of the envelop feeding rolls, the first roll 13 feeding the end envelop of the stack into engagement with the pair of rolls 3 3ª, and the roll 3ª serving to hold back one of the envelops, where two are fed simultaneously. As the envelop is advanced, it passes into engagement with the guide 22, which turns the flap over the inclined moistening disk 14. As this disk is also revolved, a moistened portion of its surface which is drawn from the tank 18, and from which the surplus moisture is removed by the scraper 19, will be brought into contact with the flap of the envelop as it is pressed downward by the roll 20. This will thoroughly moisten the gummed edge, and in the further movement the guide 22 will press down the flap, so as to permit it to pass between the pair of rolls 6 6ª. Between the points of engagement with the moistening disk 14 and the rolls 6 6ª the forward edge of the envelop contacts with the trigger 25, tripping it, as has already been described, and setting in motion the train of gearing comprising a gear wheel 76, pinion 75, shaft 74, pinion 73, and gear wheel 68, which revolves the sleeve 66, gear wheel 67, eccentric 36, and cams 44 and 33. The rotation of the eccentric moves the gripping jaws 28 and 29 forward, advancing the stamp strip to a position where one stamp is projected beyond the severing blades, and in a position for engagement between the rolls 46 and 47. The cam 44 then rocks the blade 41, so as to sever the strip, after which the jaws 28 and 29 move rearward, while the strip is held stationary by the spring pressed guide 39. At the same time, the severed stamp is fed between the rolls 46 and 47, and has its gummed face thoroughly moistened by contact with the wet surface of the roll 47. The stripper 57 then disengages it from the surface of this roll, and directs it between the rolls 54 and 6ª, from which it is delivered to the envelop, and is rolled into contact therewith as it is fed between the rolls 6 6ª, and from thence between the rolls 7 7ª, which completes the sealing and stamping, and delivers it to the stack holder 9. All of these movements occur in rapid succession, and as there is no reversal or change in direction of feed, the machine may be operated at high speed.

To facilitate the proper vertical adjustment of the guide 96, a gage 106 is arranged at a convenient point, as on the stack holder 100, and which is on the level with the upper end of the flap moistening disk 14. Thus by placing an envelop on the guide 96 and adjusting the latter vertically until the envelop assumes the desired relation to the gage 106 the guide 96 will properly position the envelops for the moistening disk 14. This guide is preferably in the form of an eccentric which, when not in use, may be turned back out of the path of the envelop.

What I claim as my invention is:

1. The combination with means for successively feeding envelops in a plane, flap-moistening and closing means on one side of the plane of feed, stamp-feeding, severing, moistening and depositing mechanisms on the opposite side of the plane of feed, a common means for sealing the flap and stamp, and means whereby the operation of the stamp-applying mechanism is effected by the feeding of the envelop.

2. The combination with flap-moistening mechanism, of a pair of rolls between which the envelop is passed to seal the flap, stamp-moistening mechanism, and means for delivering the moistened stamp to the envelop as it passes between said sealing rolls.

3. The combination with flap-moistening means, of a pair of rolls between which the envelop is fed to seal the flap, stamp-feeding, severing, and moistening mechanisms, and means for delivering the severed and moistened stamp to the envelop as it passes between the sealing rolls.

4. The combination with flap-moistening means, of a pair of rolls for sealing the flap, normally inoperative stamp-feeding, severing and moistening mechanisms, and a trip for causing the operation of said mechanisms actuated by the forward end of the envelop, whereby the moistened stamp is attached to said envelop as it passes between said sealing rolls.

5. The combination with means for feeding the envelop, of flap moistening and stamp applying mechanisms arranged upon opposite sides of the plane of feed, a pair of rolls for simultaneously sealing the flap and applying the stamp to the envelop, mechanism for operating said rolls, the feeding means and the flap moistening means, continuously, and means operated by the forward end of the advancing envelop for timing the operation of the stamp applying mechanism whereby a stamp is delivered to be sealed on to the said envelope.

6. The combination with a constantly revolving sealing roll, and means for feeding envelops successively thereto, of rotative means controlled and timed by the advancing envelop for delivering a stamp to said sealing roll so as to be rolled thereby into contact with the envelop.

7. The combination with a constantly revolving sealing roll, of an intermittently operated stamp delivering mechanism, one of the rolls of said stamp delivering mechanism being arranged adjacent and coöperating with said sealing roll to deliver a stamp therebetween.

8. The combination with a constantly operated sealing roll, of stamp applying mechanism, actuating mechanism for said stamp applying mechanism, a normally inoperative drive train connecting said sealing roll and said mechanism, and a clutch for coupling said train.

9. The combination with stamp and flap moistening means, of a common means for initially pressing said stamp and flap into engagement with the envelop, and a common means for completing the sealing of said stamp and envelop.

10. In an envelop sealing and stamping machine, the combination with flap moistening mechanism, of a continuously revolving sealing roll, means for intermittently delivering stamps to said sealing roll, means for feeding an envelop to the latter, and means operated by the advancing envelop for controlling and timing said stamp delivery mechanism.

11. The combination with flap-moistening mechanism, of means for sealing the flap, stamp moistening mechanism, and means for delivering the moistened stamp to the envelop as it passes into engagement with the flap-sealing means whereby the latter affixes the stamp to the envelop.

12. In an envelop sealing and stamping machine, the combination of oppositely-arranged stamp-applying and flap-sealing mechanisms including vertical rolls, of means operated by the envelop passing through the machine for effecting the coöperative action of said mechanisms.

In testimony whereof I affix my signature in presence of two witnesses.

JOSEPH J. SCHERMACK.

Witnesses:
AMELIA WILLIAMS,
JAMES P. BERRY.